(12) United States Patent
Bankstahl et al.

(10) Patent No.: US 6,753,503 B2
(45) Date of Patent: Jun. 22, 2004

(54) OIL SEPARATOR FOR A WELDER

(75) Inventors: Herbert A. Bankstahl, Appleton, WI (US); Joseph Gitter, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/191,335

(22) Filed: Jul. 8, 2002

(65) Prior Publication Data

US 2004/0004065 A1 Jan. 8, 2004

(51) Int. Cl.⁷ .............................. B23K 9/00; B23P 17/00; B01D 45/08
(52) U.S. Cl. ............................ 219/133; 29/888; 95/267; 55/462
(58) Field of Search ............................. 219/133, 134; 29/888; 417/430; 290/1 A; 96/189; 95/260, 262, 267, 269, 271; 55/434, 447, 462, 465

(56) References Cited

U.S. PATENT DOCUMENTS

| | | | | |
|---|---|---|---|---|
| 4,214,883 A | * | 7/1980 | Raseley et al. | 96/189 |
| 4,269,607 A | * | 5/1981 | Walker | 95/271 |
| 4,424,068 A | * | 1/1984 | McMillan | 95/243 |
| 5,113,671 A | * | 5/1992 | Westermeyer | 62/468 |
| 6,475,255 B1 | * | 11/2002 | Walker, Jr. | 55/315 |
| 6,674,046 B2 | * | 1/2004 | Bankstahl et al. | 219/133 |

OTHER PUBLICATIONS

Miller Air Pak Owner's Manual (OM–78) Miller Electric Manufacturing Co., Mar. 2001.
www.compressedairchallenge.org/content/library/source-book/index.htm "Introduction to Industrial Compressed Air Systems", article date unknown, viewed Oct. 7, 2002.
www.dynamicpowersource.com Powerbox, Dynamic Power Source, article date 2001, viewed Jan. 9, 2002.
www.lincolnelectric.com Shield Arc® SAE–400 Weld'N Air, article date unknown, viewed unknown.
www.millerwelds.com Miller Air Pak, Engine Driven Welder/Generator, issued Jan. 2001, viewed Nov. 28, 2001.

\* cited by examiner

*Primary Examiner*—Kiley Stoner
*Assistant Examiner*—Kevin P. Kerns
(74) *Attorney, Agent, or Firm*—Ziolkowski Patent Solutions Group, LLC

(57) ABSTRACT

An oil separator usable with a welder and air compressor combination unit. The oil separator includes a cylindrical housing having an inlet that receives the stream of compressed air containing oil from the air compressor. Within the oil separator, there is a deflector baffle that redirects the flow of the oil to a swirling, downwardly directed path along the inner surface of the cylindrical housing where the air is separated out therefrom and passes upwardly to exit through a fluid outlet formed in the cover of the separator. The swirling oil flows downwardly through an annular slot formed between a circular plate and the inner surface of the cylindrical housing into a lower chamber where the oil is channeled by radially directed baffles into radial channels to redirect that oil toward an oil outlet at the center of the circular bottom where that oil exits to be re-circulated in the combination unit or for disposal.

16 Claims, 8 Drawing Sheets

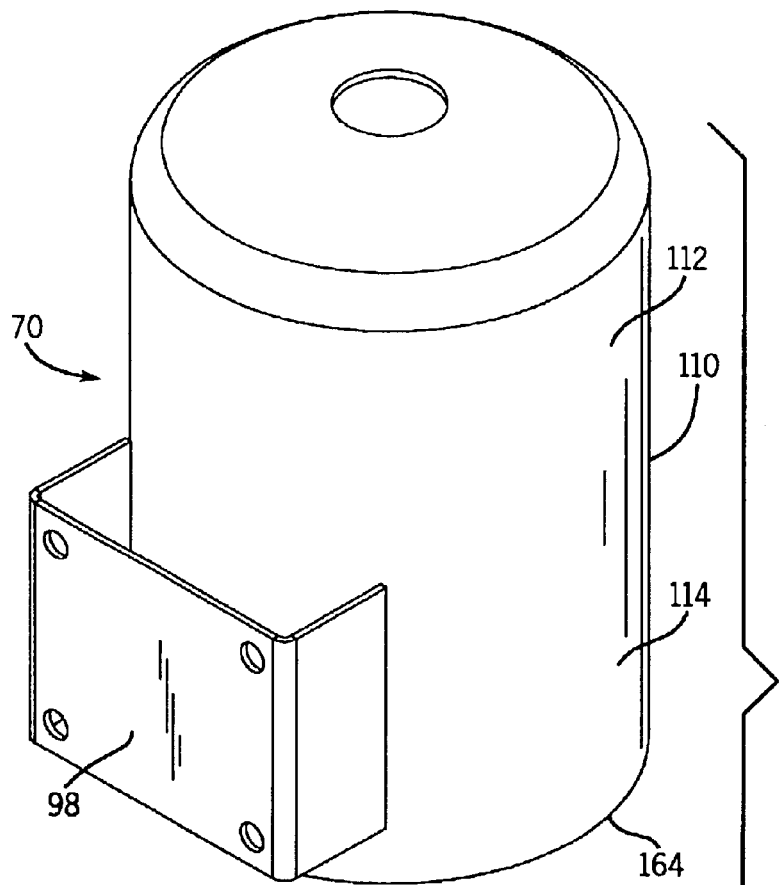
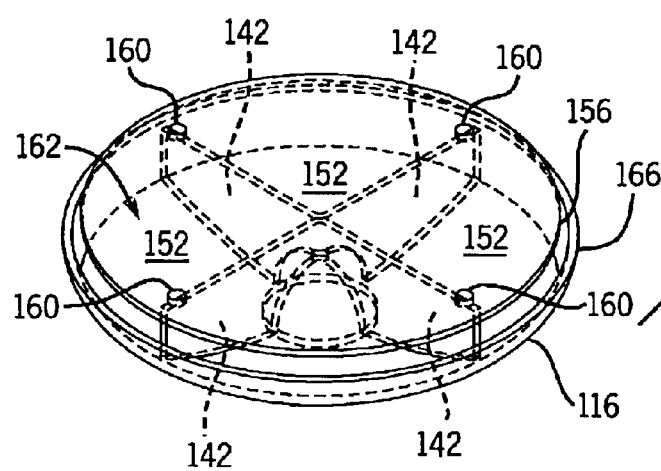
FIG. 6

OIL SEPARATOR FOR A WELDER

BACKGROUND OF THE INVENTION

The present invention relates generally to combined welder and compressor units, and more particularly to a unit of this type having an oil separator for separating oil from a pressurized fluid containing oil.

Portable welding and compressor units transportable to a work site are known. Typical known units include a lightweight frame consisting of metal tubing on which is mounted an internal combustion engine that is directly connected to a generator which generates an amperage to operate the unit or welder. The generator further provides auxiliary alternating current for operating auxiliary equipment, such as an air compressor. The air compressor provides compressed air for pneumatic equipment as well as certain welding applications, such as operating a plasma cutting torch. Other known portable welder and compressor units include an engine, alternator, compressor, and air tank assembly mounted within a housing along an extended length of the housing.

In such welder and compressor units, there is a stream of fluid, normally air, that comes from the compressor and which is desired to be used for some end purpose requiring a source of pressurized air. That stream, however, may contain a large quantity of oil and which is not desirable for most end uses and, additionally, it is important to recover that oil to reuse the oil in order to efficiently operate the welder and compressor unit. Accordingly, one of the normal components of such welder and compressor units is an oil separator, that is, a separator that acts upon a stream of fluid that contains oil to separate the oil for reuse, or disposal in the event the oil is intended to be completely changed, and to thereby also provide a source of pressurized air that is sufficiently free of the presence of oil so as to be used for some end purpose, such as a compressed air supply for the operation of pneumatic equipment.

Therefore, one of the main purposes of the oil separator of such welder and air compressor combinations is to separate the air and the oil so that the oil can be recovered and the air used for the desired end purpose and, particularly with a welder and compressor combination unit, it is also important that the oil separator be compact or at least be minimized in its overall size so as to be transportable along with the welder and compressor unit while carrying out the efficient separation of the oil from the stream of fluid containing that oil.

BRIEF DESCRIPTION OF THE INVENTION

The present invention is directed to an improved oil separator that is particularly adapted to be used with a welder and compressor combination to supply compressed air and electrical current for pneumatic and arc welding operations to overcome the aforementioned concerns.

In the preferred embodiment, and as will be specifically described herein, the present oil separator will be described and illustrated as being used with a compressor and portable welder unit and where the compressor is preferably an internal screw compressor, however, it will become clear that the present oil separator may be used with a wide variety of other apparatus and equipment to carry out its function of separating oil from a stream of fluid, including fluids other than air, for many purposes.

Thus, with the present invention, an oil separator is provided that is relatively compact and yet efficiently carries out the function of separating oil from the stream of air containing that oil that is received from an air compressor. In the present invention, the oil separator has a arcuate housing, preferable cylindrical, and has a closed cover enclosing the upper portion of the housing and a bottom enclosing a lower portion. An inlet is located in the upper portion of the housing and through which the stream of fluid containing a quantity of entrained oil passes into the interior of the housing. A baffle or deflector directs that path of the flow of the oil laden stream to create an oil flow generally around the circular inner surface of that housing such that the oil tracks in a circular or spirally downwardly path aided by the force of gravity to eventually travel to the bottom of the housing. At the same time, the compressed air is caused to separate out and is allowed to flow upwardly through an outlet in the upper portion of the housing, preferably in the closed cover of that housing.

The circularly flowing stream of oil that swirls downwardly along the inner surface of the cylindrical housing passes through an annular slot located at the bottom, of the housing and which annular slot is formed intermediate the internal circular surface of the housing and the exterior edge of a circular plate that is concentric with the inner surface of the cylindrical housing at which point the stream of oil thus enters a lower chamber formed in the housing beneath the circular plate. The lower chamber includes a plurality of radially directed baffles that interrupt the circular path of the movement of the oil stream and direct the oil stream inwardly toward the center area of the bottom where there is an oil outlet for removal of the oil. In the process, the compressed air flows upwardly and, as explained, exits through the fluid outlet in the upper portion of the housing, preferably the cover.

In accordance with the preferred aspect of the present invention, an engine-driven welder and air compressor combination is disclosed and includes a compressor that provides a stream of compressed air laden with oil. An oil separator is provided mounted adjacent to the engine-driven welder and compressor and receives the oil laden stream of compressed air from the compressor and separates that oil laden stream into an pressurized air stream and a separated oil stream. The compressed air can be used for some pneumatic equipment and the separated oil can then be collected and reused as a lubricant and cooling medium within the combination. As such, the overall combination welder and air compressor includes a convenient oil separator that can be used in conjunction with, physically affixed to, and transported with the combination as an integral component thereof.

In accordance with yet another aspect of the present invention, a welding and air compression system includes an oil separator that is constructed in accordance with the foregoing description and which separates oil from a stream of air laden with oil from the air compressor to provide a stream of compressed air and a stream of usable oil that has been separated from the initial stream of air laden with oil. The oil is re-circulated back to the air compressor to act as a lubricant and coolant and the compressed air is further passed through a coalescing filter to remove additional oil from the compressed air stream before directing that compressed air to an end use such as pneumatic equipment.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 6 is a perspective, exploded view of the oil separator of FIG. 4;

DETAILED DESCRIPTION OF THE PREFERRED EMBODIMENT

Figure 1:
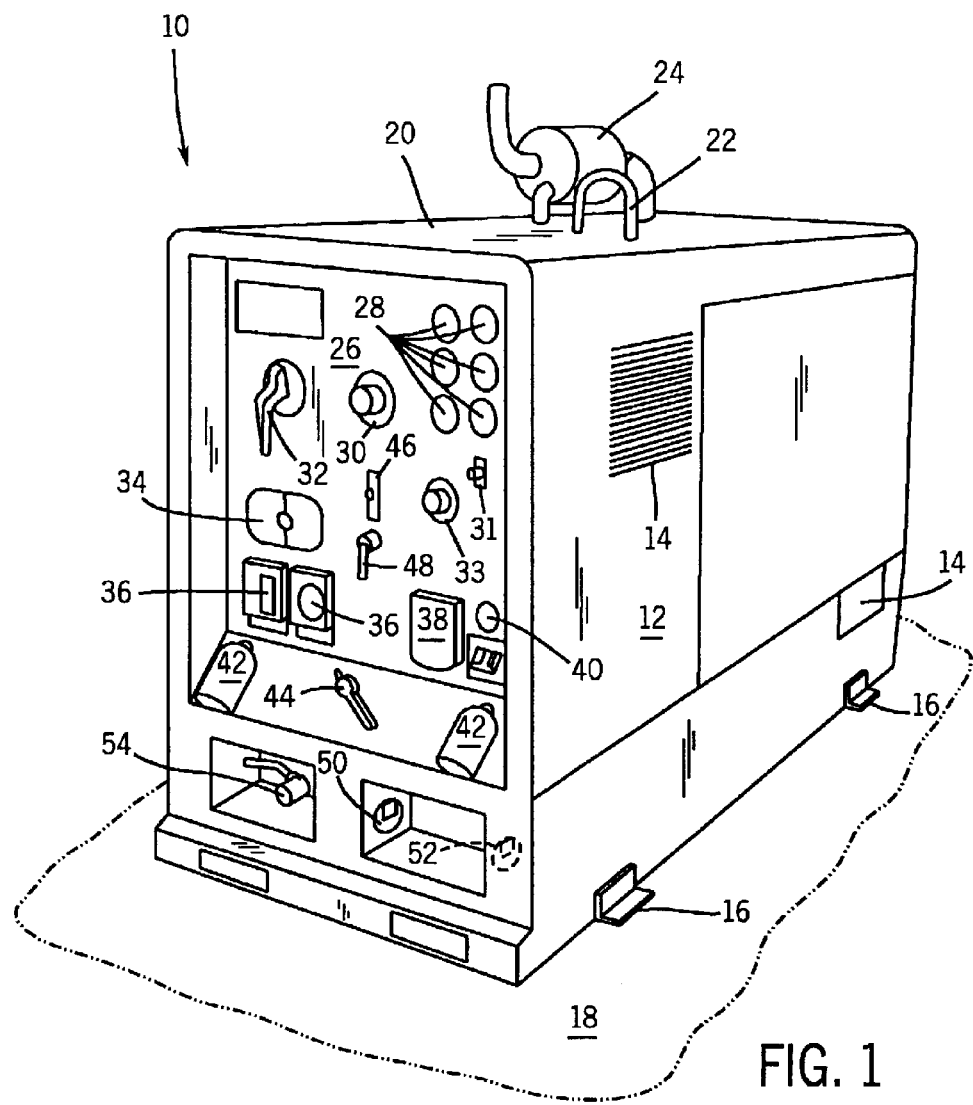
FIG. 1 is a perspective view of a welder and compressor combination incorporating the present invention.

Referring now to FIG. 1, a portable engine-driven welder and compressor combination or system 10 is provided. The welder combination 10 has an outer housing 12 that has one or more air vents 14 for cooling internal components of the welder combination 10. The housing 12 can be easily removed to permit access to the internal components for maintenance and service. A plurality of support members 16 provide stabilization for the welder combination 10 when placed on a generally level surface, such as surface 18. An upper surface 20 of the welder combination 10 includes a lifting hook 22 extending therethrough for lifting and transporting of the welder combination 10. Also attached to the upper surface 20 is an exhaust system 24 that lowers noise and removes exhaust gas from the welder combination 10.

The welder combination 10 includes a control panel 26 that has various control elements and gauges for operating the welder combination 10. A plurality of gauges 28 measure various parameters of the welder combination 10. Measured parameters can include oil pressure, fuel level, oil temperature, battery amperage, air pressure, and engine running time of the welder combination 10. Control panel 26 also has a control dial 30 and an ampere range switch 32 which are used to select a voltage/amperage for welding operations. Process selector switch 34 selects the type of weld output. The weld output is determined by the type of welding process. Examples of weld processes that may be implemented include stick welding, TIG welding, air-carbon arc cutting, and various wire feed processes. Electrical outlets 36 provide power for electrically driven devices, such as saws, drills, etc. Control panel 26 also includes a compressor on/off switch 31 and an engine control switch 33 to independently control the compressor and engine, respectively.

The control panel 26 also includes multiple power connections such as a single phase power connect 38, an optional three-phase power connect 40, and weld-power receptacles 42. An optional polarity switch 44 can be used to select the polarity of the weld output. Typical selections include direct current electrode negative, direct current electrode positive, and alternating current. A panel remote switch 46 and remote receptacle 48 select remote control of the welder combination 10 in instances where welding operations are remotely located from the welder combination 10. Positive 50 and negative 52 battery charge connections are used for battery jumpstart or charging, and are positioned adjacent to a system output or shut-off valve 54. Upon engaging of the compressor clutch and opening of valve 54, compressed air is supplied for air assisted carbon arc cutting or to air driven power tools and other pneumatic operations.

Figure 2:
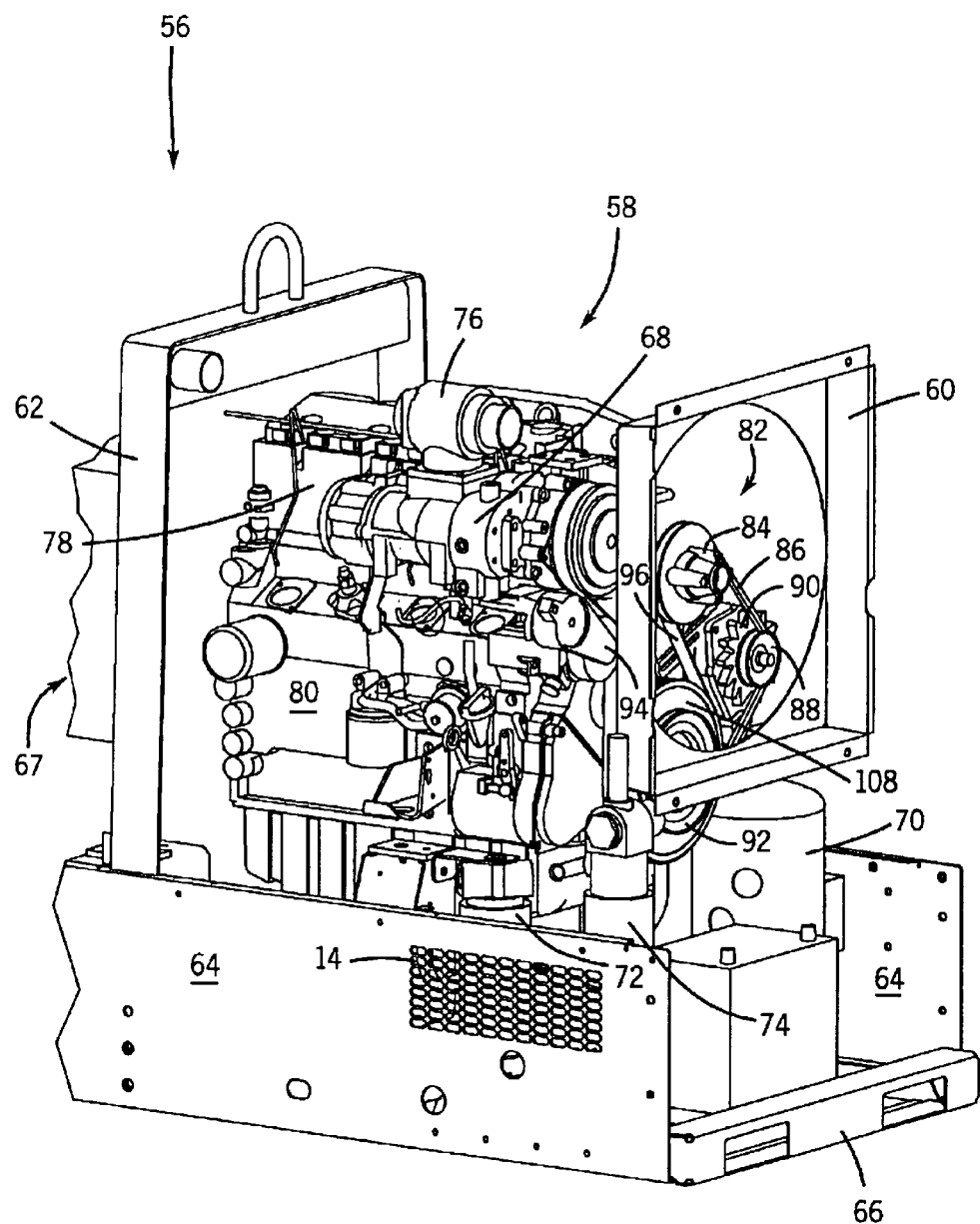
FIG. 2 is a perspective view of a portion of the welder and compressor combination with a housing cover removed.

Referring now to FIG. 2, a perspective view of a portion 56 of the welder combination 10 of FIG. 1 is shown with the housing cover 12 removed. An internal combustion engine 58 is mounted to a frame assembly 64 between a radiator shroud 60 and a lifting hook support member 62. The engine 58, in a preferred embodiment, is oil cooled and configured to re-circulate engine cooling oil. The lifting eye support member 62 secures to the frame assembly 64 for structural support during lifting of the welder combination 10. The frame assembly 64 has air vents 14 that permit air flow through the welder combination 10 to cool the internal components. Cross-brace 66 provides structural support for the frame assembly 64. An electrical generator 67 configured to generate an arc welding current is mounted within the housing 12 of the welder combination 10 and driven by the engine 58. The welder combination further includes a screw air compressor 68 mounted to the engine 58 that is configured to provide compressed air to the shut-off valve 54 of FIG. 1. The screw air compressor 68 is fluidly connected to an oil separator 70, a coalescing filter 72, which combine to separate oil from an air/oil mixture and a first particle oil filter 74.

The internal combustion engine 58 of the welder combination 10 includes an air intake connected to an intake manifold and engine head 78. The engine head 78 is mounted to an engine block 80, which collectively form the engine 58. A pulley arrangement 82 is bolted to both the engine head 78 and the engine block 80 and includes a fan blade hub 84 rotated by a first drive belt 86, such as a serpentine belt. The first drive belt 86 further connects to an alternator pulley 88 that drives an alternator 90 by a first crankshaft pulley 92. A belt tensioner 94 connects to a mounting bracket to maintain tension on a second drive belt 96 that drives the screw air compressor 68 driven by a second crankshaft pulley 108.

Figure 3:
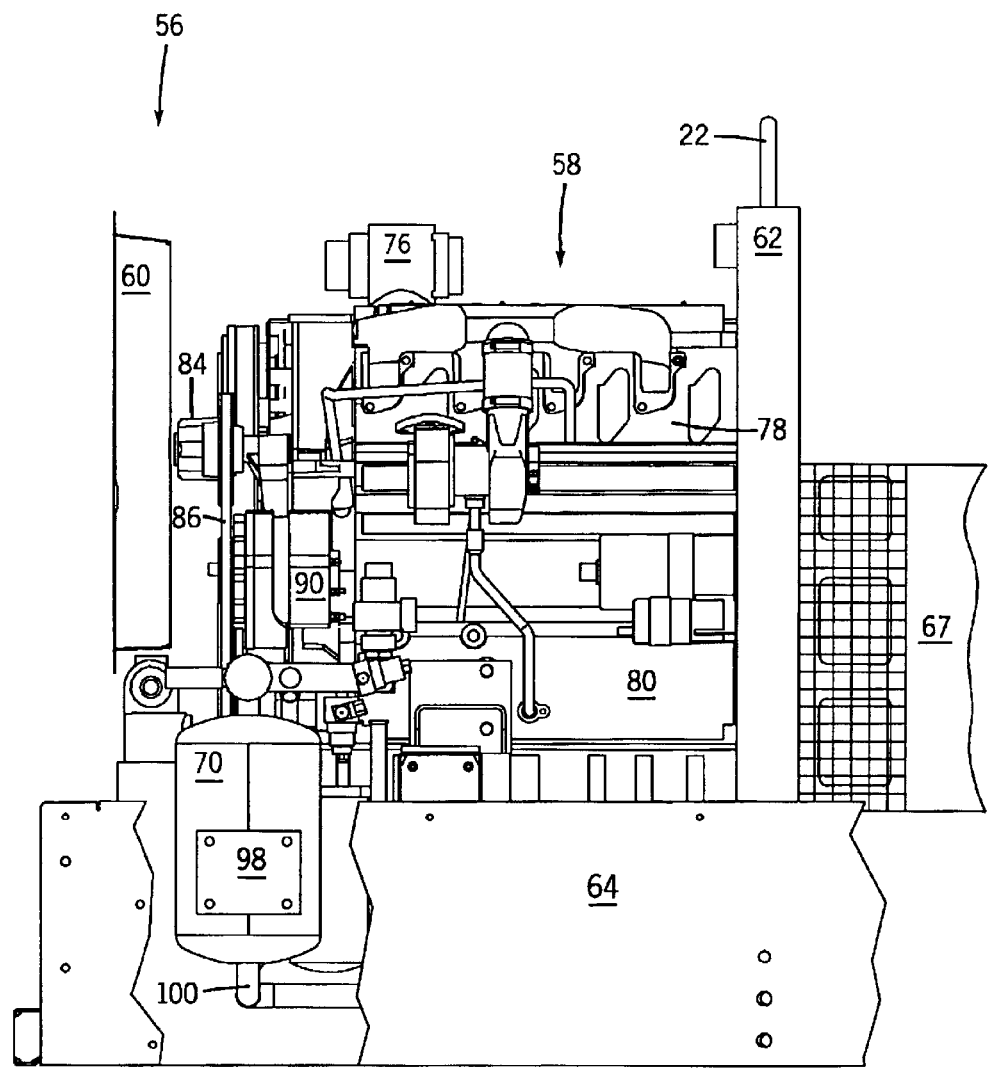
FIG. 3 is a side view of the welder and compressor combination of FIG. 2.

Referring now to FIG. 3, a side view of the portion 56 of FIG. 2 is shown. Frame assembly 64 connects to support member 62 which is attached to lifting eye 22. The internal combustion engine 58 is shown having fan blade hub 84 attached to the engine head 78 as previously discussed with reference to FIG. 2. A fan (not shown) is attached to fan blade hub 84 that is housed in the radiator shroud 60. Engine block 80 has alternator 90 mounted thereto which is driven by the first drive belt 86. The electrical generator 67 mounts to the engine block 80 and is rotated by the engine 58 to generate the arc welding current used in welding operations. Oil separator 70 is mounted to the frame assembly 64 with a mounting plate 98. An oil return line 100 of the oil separator 70 connects the oil separator 70 to other equipment, such as a radiator and ultimately back to the air compressor 68 (FIGS. 1–3) for cooling and lubrication thereof. An air intake 76 is provided to supply air to the screw air compressor 68.

Figure 4:
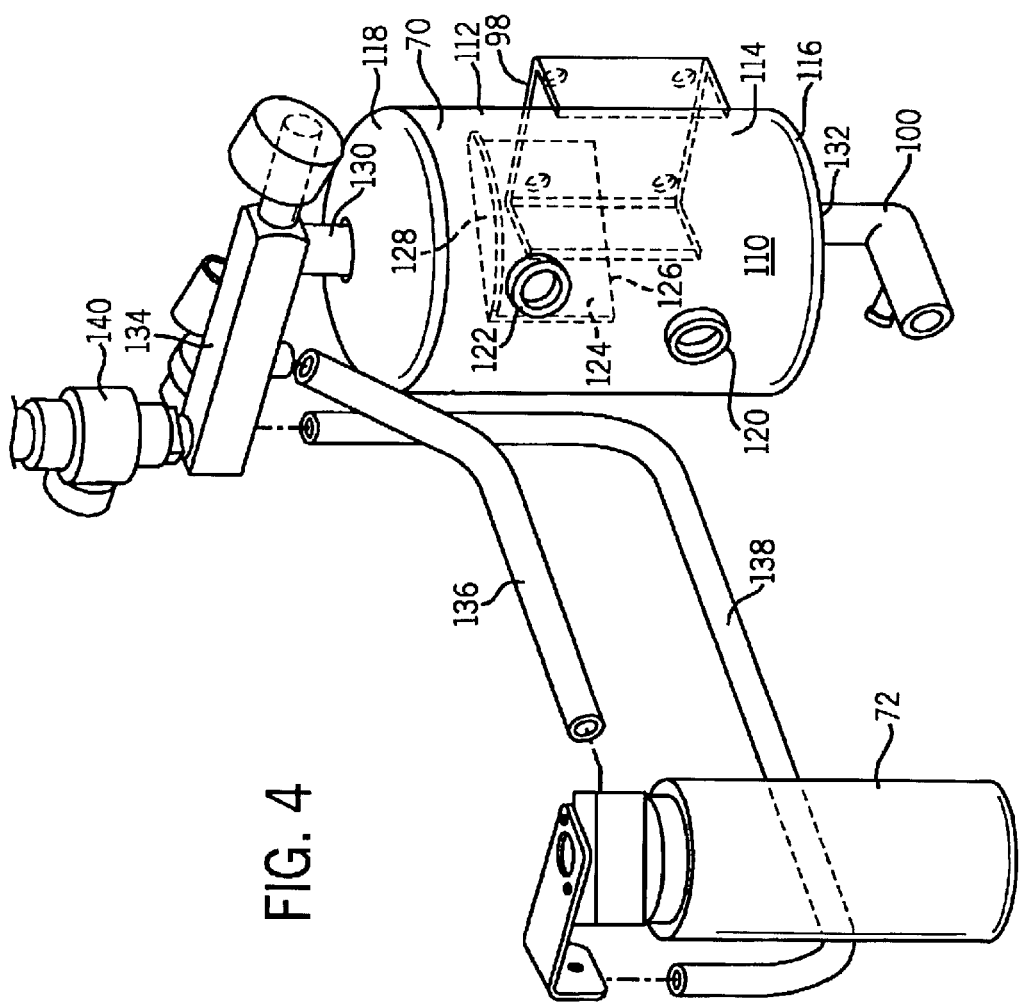
FIG. 4 is a perspective view of the oil separator constructed in accordance with the present invention.

FIG. 4 is a perspective view of the oil separator 70 that is used with the present invention along with the coalescing filter 72. Taking first, the oil separator 70, there is a tank or housing 110 that is generally cylindrical in configuration, however, other arcuate figures could be used, the cylindrical shape being the most practical and economical. The housing 110 can be subdivided into an upper portion 112 and a lower portion 114, the reference being of importance since, as will be seen, the force of gravity plays a part in the use and operation of the oil separator 70. There further is a bottom 116 and a cover 118, both of which may be permanently affixed to the housing 110.

There is a sight glass or oil level gauge 120 present in the housing 110 in order for the user to observe the level of the oil that is present within housing 110. In addition, there can be seen an inlet 122 formed in the upper portion 112 of the housing 110 and which is adapted to be connected to the outlet of the air compressor 68 (FIGS. 1–3), and therefore receives compressed air laden with oil from that air compressor 68. As the air laden with oil thus enters the housing 110, it immediately strikes a deflector baffle 124 that is located within the housing 110 in close proximity to the inlet 122 so that the flow of the air and oil mixture is directed by the deflector baffle 124 toward the inner surface of the housing 110.

The oil stream thereby contacts the inner surface of the housing 110 and proceeds in a circular swirling path around the inner surface of the housing 110 while, at the same time, being acted upon by the force of gravity so that the mixture is continually being progressed toward the lower portion 114 of the housing 110 and, ultimately, into the bottom 116. At the same time, the compressed air separated from the oil progresses upwardly.

The deflector baffle 124 itself can be of a variety of configurations, however, in the preferred embodiment, there is a relatively flat deflector plate 126 that carries out the deflection of the air steam laden with oil and that flat plate 126 is affixed to the inner surface of the housing 110 by means of a curved flange 128 having a peripheral edge that is shaped to be contiguous to the inner surface of the housing 110 and can be welded thereto.

Accordingly, while the oil "swirls" downwardly in response to centrifugal and gravitational forces along the inner surface of the housing 110, air is separated from the mixture and that air, under pressure, proceeds upwardly to the cover 118 where it exits through a fluid outlet 130 formed in the cover 118.

The oil continues by gravity downwardly, swirling along the inner surface of the housing 110 and reaches the bottom 116 of the housing 110 where it exits through an oil outlet 132 and thereafter is carried by the oil return line 100 where it is re-circulated back to the air compressor 68 (FIGS. 1–3) after some pre-cooling such as by a radiator (not shown) and filtering by means of a particle filter (not shown).

As noted, the mounting plate 98 is also provided in order to mount the oil separator 70 as explained in FIGS. 1–3 so that the oil separator 70 can be mounted in an integral manner to the overall welder compressor combination 10 (FIGS. 1–3) and readily transported with that apparatus.

The compressed air, now substantially free of oil, is passed through the fluid outlet 130, and that flow of air enters a manifold 134 where it is channeled into an air conduit 136 to channel the compressed air to the coalescing filter 72. The air passes through the coalescing filter 72 where a media removes still further particles of oil from the air stream and the air leaves the coalescing filter 72 through another air conduit 138 that returns the compressed air to a separate passage in manifold 134. Finally, an outlet 140 of the manifold 134 can be connected to an air outlet such as shown in FIG. 1 so that such compressed air can be available to the user for the desired end purpose.

Figure 5:
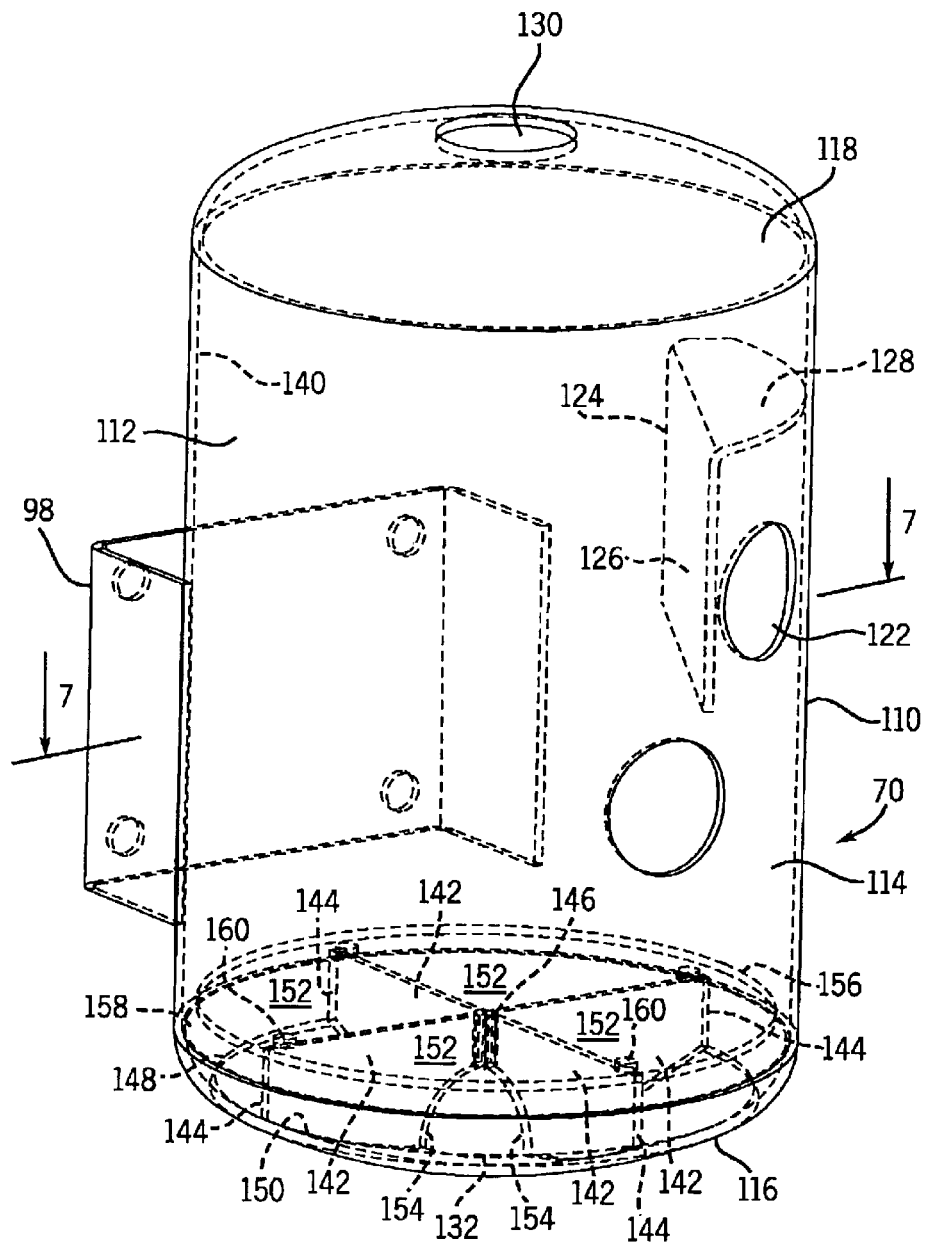
FIG. 5 is a perspective view showing the construction of the oil separator of FIG. 4.

Turning now to FIG. 5, there is a perspective view of the oil separator 70 constructed in accordance with the present invention. Again, there can be seen that the overall housing 110 is a cylindrical shaped tank and which is the preferred configuration. The cover 118 caps off the upper portion 112 of the housing 110 and has a fluid outlet 130 formed therein for the compressed air to pass out of the oil separator 70. The fluid inlet 122 is formed in the side of the housing 110 and the air, laden with oil, thereby enters the housing 110 for the separating treatment. As also can be seen, the deflector baffle 124 is located proximate to the inlet 122 so that the flow of air and oil that is directed into the housing 110 thorough inlet 122, strikes the deflector baffle 124 and is diverted so as to direct a stream of oil toward the inner surface 140 of the housing 110 where that stream swirls in a circular and downward pathway toward the lower portion 114 and ultimately to the bottom 116 of the housing 110. As that stream progresses, the air is separated from the oil and that air, at an elevated pressure, exits the housing 110 through the fluid outlet 130. Since the downward component of the path is by means of the force of gravity, it is also noted that the mounting plate 98 is oriented such that the longitudinal axis of the cylindrical housing 110 is substantially vertical.

Also shown in FIG. 5 is the bottom 116 of the housing 110 where there are a plurality of radially directed baffles 142. In the preferred embodiment, there are four of such radially directed baffles 142 oriented at 90 degrees apart with respect to each other and can have the outer edges 144 affixed to the inner surface 140 of the housing 110 by welding and also have their inner edges 146 each affixed together at about the center of the circular configured bottom 116. The lower edges 148 of the radially directed baffles 142 are affixed to the lower, inner surface 150 of the bottom 116 so that a pie shaped radial channel 152 is formed intermediate each of the radially directed baffles 142 such that, as will be seen, the oil that is moving in the swirling, downward path will enter each of the radial channels 152 to direct that oil towards the center of the circular shaped bottom 116, that is, toward the oil outlet 132 that is generally located at that center.

Each of the radially directed baffles 142 also has an arcuate opening 154 so that the oil is free to pass through the radial channels 152 and pass through that oil outlet 132. There is also a circular plate 156 that is located atop of the radially directed baffles 142 and that circular plate 156 is coaxial with the circular shaped bottom 116. The diameter of the circular plate 156 is smaller than the inner surface 140 of the cylindrical housing 110 such that there is a substantially annular slot 158 formed between the outer edge of the circular plate 156 and the inner surface 110 of the housing 140. In the preferred embodiment, that difference in the diameters can be about ½ inch such that the overall width of the annular slot 158 is about ¼ inch.

In order to affix the circular plate 156 of the upper edge of the radially directed baffles 142, there may be a plurality of holes 160 formed at, for example, 90 degree spacing around that circular plate 156 so that the circular plate 156 can be located atop of the radially directed baffles 142 such that at least one of the holes 160 lines up with one of the radially directed baffles 142. Such orientation can easily be accomplished with sufficient accuracy so as to align the circular plate 156 in the proper location and to be coaxially affixed thereto.

Turning now to FIG. 6, there is shown an exploded view of the present oil separator 70 with the bottom 116 in position to be affixed to the lower portion 114 of the housing 110. As noted, the bottom 116 can be constructed as a unitary component, that is, the circular plate 156 is welded to the radially directed baffles 142 forming the lower chamber 162 in the bottom 116. The radially directed baffles 142 are affixed to the bottom 116 so that the pre-constructed bottom 116 including the radially directed baffles 142 and the radial channels 152 are already in place when the bottom 116 can be affixed, as a unit, to the lower edge 164 of the cylindrical housing 110 by welding the upper rim 166 of the bottom 116 to the lower edge 164 of the circular housing 110 to carry out that step in the assembly of the present oil separator 70.

Figure 7:
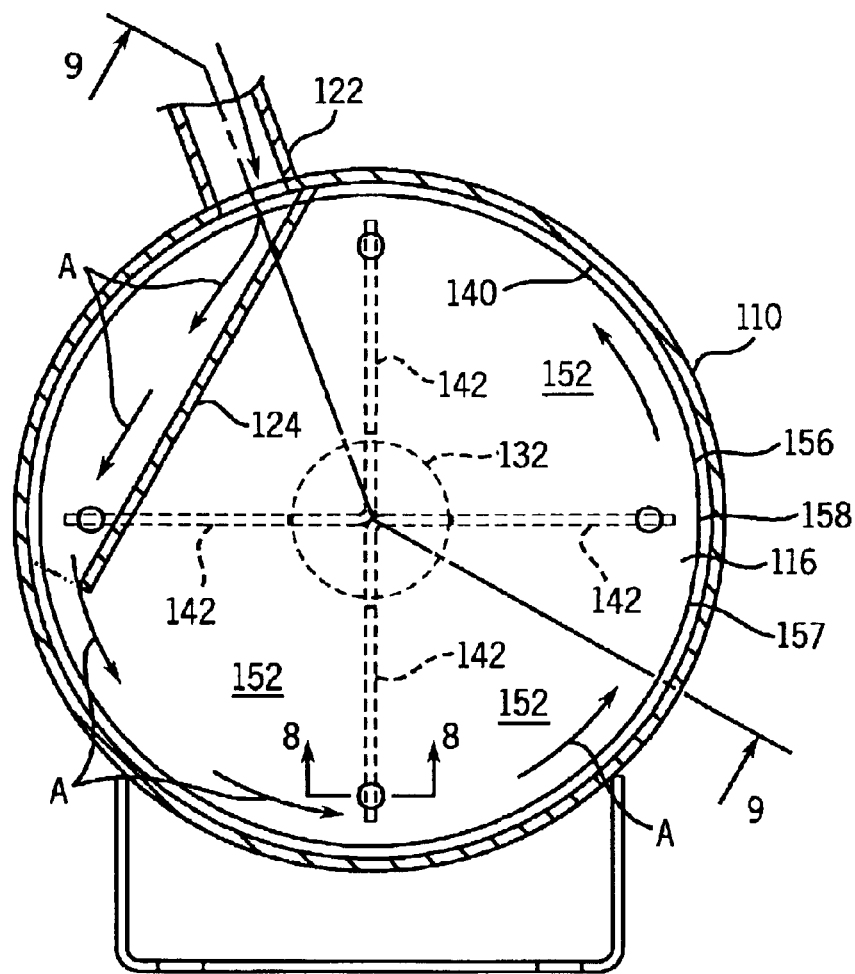
FIG. 7 is a cross sectional view of the oil separator of FIG. 4 taken along the lines 7—7 of FIG. 5.

Turning now to FIG. 7, there is shown a cross sectional view of the oil separator 70 of the present invention taken along the line 7—7 of FIG. 5. In this Figure, the flow path of the air laden with oil can be seen where the stream of that air containing oil from the air compressor 68 (FIGS. 1–3) enters the housing 110 through the inlet 122, shown by the arrows A, and immediately is deflected by the deflector baffle 124 to follow the inner surface 140 of the housing 110 where, as explained, it descends downwardly by the force of gravity toward the oil outlet 132 formed in the bottom 116 of the oil separator 70.

As the oil reaches the circular plate 156, it passes through the annular slot 158 formed between the outer edge 157 of the circular plate 156 and the inner surface 140 of the housing 110 to the lower chamber 162 (FIG. 6) where that flow of oil strikes the radially directed baffles 142 to redirect that flow of oil through the radial channels 152 to the oil outlet 132. As such, the initial swirling motion or path of the oil is changed after entering the lower chamber 162 to an inward, radial direction by means of the radically directed baffles 142 toward and exiting through the oil outlet 132.

Figure 8:
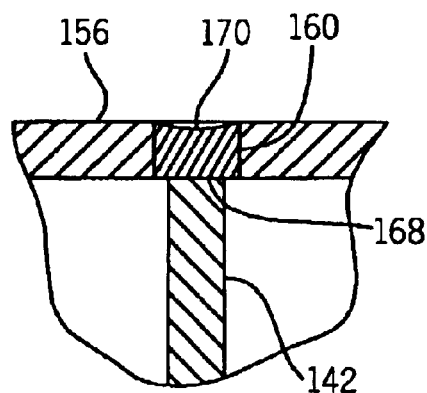
FIG. 8 is an enlarged cross sectional view of a welded joint used in constructing the oil separator of the present invention and taken along the lines 8—8 of FIG. 7.

Turning now to FIG. 8, there is shown an enlarged cross sectional view of the circular plate 156 as it is preferably affixed to a radial directed baffle 142 taken along the line 8—8 of FIG. 7. As can be seen, the hole 160 is provided, by drilling, in the circular plate 156 and that hole 160 is, during the construction, aligned with one of the radially directed baffles 142 so that the upper edge 168 of the radially directed baffle 142 can actually be seen through the hole 160. A weld material 170 can be laid down into the hole 160 to weld the circular plate 156 to the upper edge 168 of the radially directed baffle 142. By continuing the welding process to the other of the radially directed baffles 142, the circular plate 156 can be accurately and easily affixed to the upper edges 168 of the radially directed baffles 142.

Figure 9:
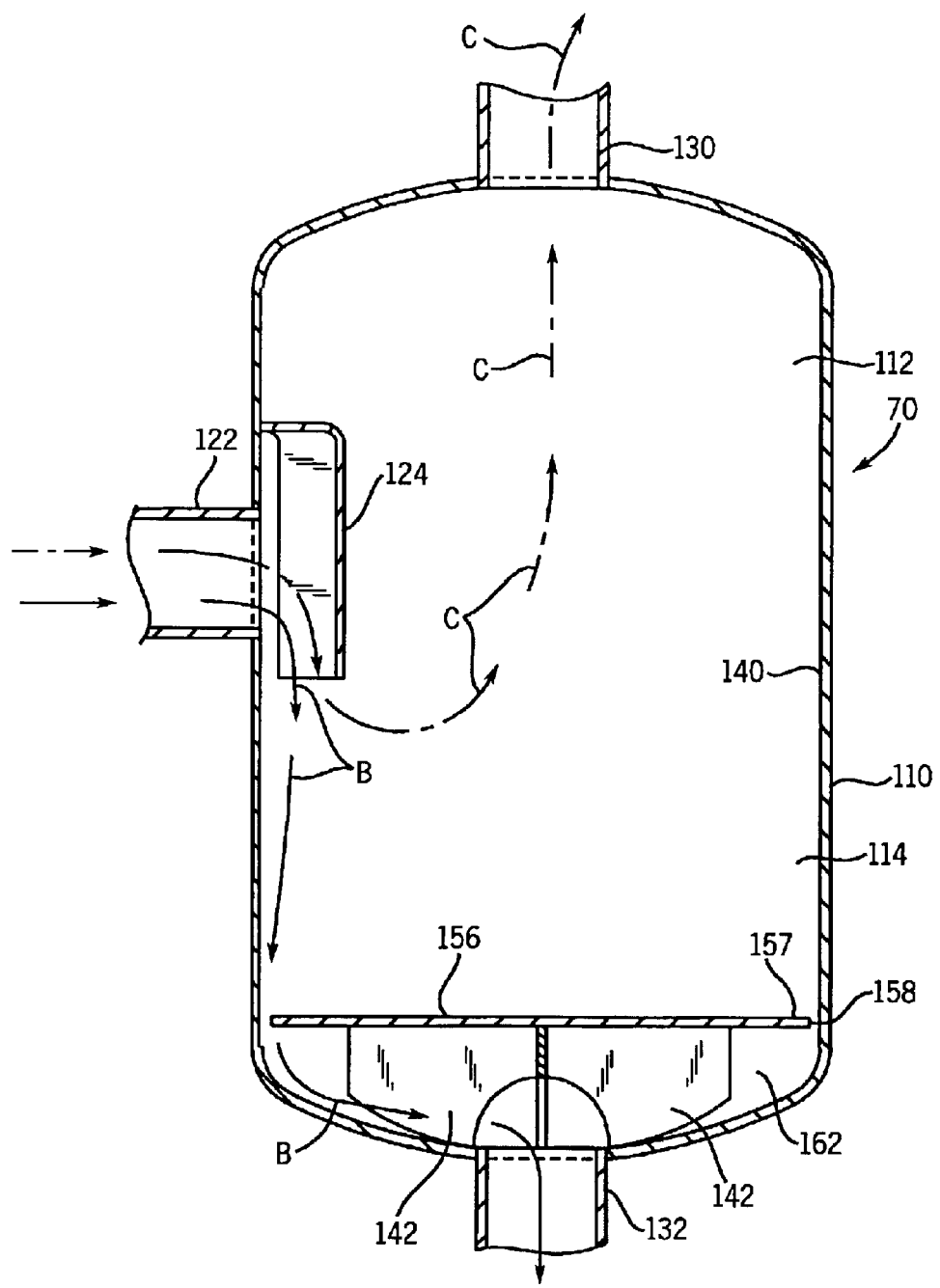
FIG. 9 is a side cross sectional view of the oil separator of the present invention taken along the lines 9—9 of FIG. 7.

Turning finally to FIG. 9, there is shown a side cross sectional view of the present oil separator 70 taken along the line 9—9 of FIG. 7. Again, the path of the oil can be seen as depicted by the arrows B such that the air laden with oil enters the housing 110 through the inlet 122 where that oil continues in a swirling, downward path along the inner surface 140 of the housing 110 where it ultimately passes through the annular slot 158 between the outer edge 157 of the circular plate 156 and the inner surface 140 of the housing 110 into the lower chamber 162 where that oil is redirected by the radially directed baffles 142 toward the oil outlet 132.

The compressed air, on the other hand, follows the path depicted by the arrows C where that air is initially directed by the deflector baffle 124 whereupon it travels upwardly through the upper portion 112 of the chamber 110 where it exits through the fluid outlet 130.

In accordance with one aspect of the present invention, a welder and compressor combination includes a transportable housing and an engine mounted within the transportable housing. The welder and compressor combination also includes an electrical generator configured to generate an arc-welding current. The electrical generator is mounted within the transportable housing and driven by the engine. The welder and compressor combination further includes a screw air-compressor having a clutch assembly driven by a belt in operable association with the engine.

In accordance with another aspect of the present invention, a welder and air compressor combination includes an air compressor that provides a stream of compressed air containing a quantity of oil. The air containing the oil is directed to an oil separator where a special separator is constructed so as to separate the air and the oil efficiently and with an optimization of space required for the separator. The separated air can be used for some end utilization means such as pneumatic equipment while the oil can be recovered for re-circulation and reuse in the welder and air compressor combination.

The present invention has been described in terms of the preferred embodiment, and it is recognized that equivalents, alternatives, and modifications, aside from those expressly stated, are possible and within the scope of the appending claims.

What is claimed is:

1. A method of forming a lower chamber in an oil separator, said method comprising the steps of:
   providing an oil separator having a cylindrical housing and a circular bottom;
   providing a plurality of generally planar baffles extending vertically upwardly from the bottom and having upper edges;
   providing a baffle plate having holes formed therein in predetermined locations;
   positioning said baffle plate atop of said upper edges of said baffles so as to align said holes with said upper edges of said baffles; and
   welding said baffle plate to said upper edges of said baffles by laying a weld bead within said holes to contact and fuse with said upper edges of said baffles.

2. A method of forming an oil separator as defined in claim 1 wherein said step of providing a plurality of generally planar baffles comprises providing baffles that are radially oriented with respect to said baffle plate.

3. A method of forming an oil separator as defined in claim 1 wherein said step of providing a baffle plate having holes formed therein comprises providing a baffle plate having at least one hole to align with each of said baffles.

4. A welding and air compression system comprising:
   an air compressor for providing a stream of compressed air containing oil;
   means for generating an arc welding current;
   means for driving both the air compressor and the means for generating an arc welding current;
   an oil separator comprising a cylindrical housing having an inlet for receiving the stream of compressed air containing oil for said air compressor, said oil separator further having a upper portion having an air outlet and a generally circular bottom having an oil outlet located at about the center thereof;
   said oil separator having a deflector baffle proximate to said inlet to direct oil in said stream toward said inner surface of said cylindrical housing to cause said oil to swirl around the inner surface in a generally downward direction toward said oil outlet while allowing said compressed air to progress upwardly to said air outlet; and
   baffle means located at the bottom of said housing to redirect said swirling path of the oil from said inner surface of said housing into a radially inwardly path toward said outlet.

5. A welding and air compression system as defined in claim 4 wherein said bottom is substantially circular and said oil outlet is located at about the center of said bottom.

6. A welding and air compression system as defined in claim 5 wherein said baffle means comprises a plurality of baffles that form radial channels to direct the oil from the inner surface of said housing to said oil outlet.

7. A welding and air compression system as defined in claim 4 wherein said plurality of radial baffles are formed in said bottom and are radially formed along said bottom at predetermined intervals.

8. A welding and air compression system as defined in claim 4 wherein said baffle means is contained within a lower chamber formed in said housing.

9. A welding and air compression system as defined in claim 8 wherein said baffle means comprises a plurality of vertically disposed radial baffles having upper edges, and said lower chamber is formed by a baffle plate located above and proximate to the upper edges of said baffles to form an annular slot between said circular plate and the inner surface of said cylindrical housing.

10. A welding and air compression system as defined in claim 9 wherein said baffle plate abuts said upper edges of said baffles.

11. A welding and air compression system as defined in claim 10 wherein said baffle plate is affixed to said upper edges of said baffles.

12. A method of separating oil for a stream of compressed air containing oil, said method comprising the steps of:

providing a cylindrical housing having an inlet, an air outlet above said inlet and an oil outlet below said inlet;

directing a stream of oil from the stream of compressed air containing oil toward the inner surface of the cylindrical housing to form a swirling stream of oil along the inner surface of the housing that progresses downwardly while allowing air separated from the stream of compressed air containing oil to pass through the air outlet; and providing at least one radially directed baffle located proximate to said oil outlet to redirect the swirling path of the stream of oil from the inner surface of the housing into a radial path toward said oil outlet.

13. A method as defined in claim 12 wherein said step of providing at least one radial directed baffle comprises providing a plurality of radially directed baffles contained within a lower chamber in said housing.

14. A method as defined in claim 13 where said step of providing said baffles contained within a lower chamber comprises providing a substantially circular plate located above said plurality of radially directed baffles to form the lower chamber.

15. A method as defined in claim 14 where said step of providing a substantially circular plate located above said plurality of radially directed baffles comprises affixing the circular plate to the radially directed baffles.

16. A method as defined in claim 15 where said step of affixing the substantially circular plate to said radially directed baffles comprises welding the substantially circular plate to the radially directed baffles so as to form a annular slot between the substantially circular plate and the inner surface of the cylindrical housing.

* * * * *